May 30, 1961    C. J. CLEMENTS, JR    2,986,428
BRAKE OPERATING SYSTEM
Filed Nov. 15, 1957    5 Sheets-Sheet 1

INVENTOR.
CLARENCE J. CLEMENTS JR
BY
Donald P. Smith
ATTORNEY

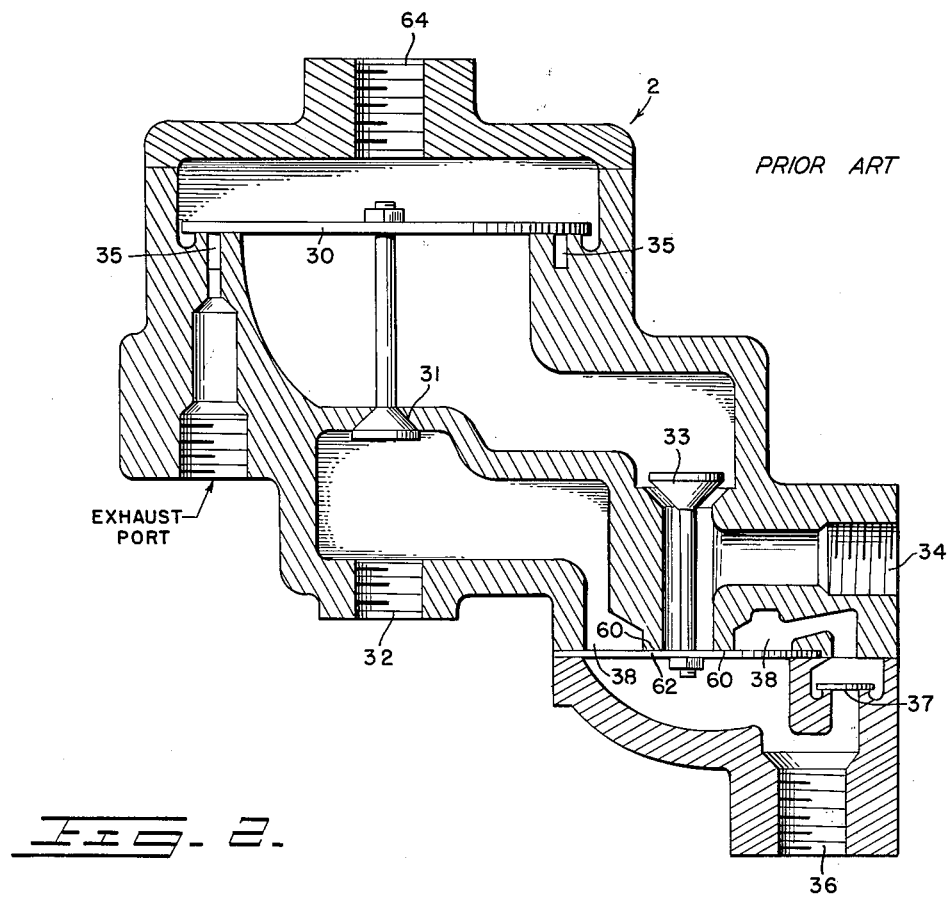

May 30, 1961 C. J. CLEMENTS, JR 2,986,428
BRAKE OPERATING SYSTEM
Filed Nov. 15, 1957 5 Sheets-Sheet 3
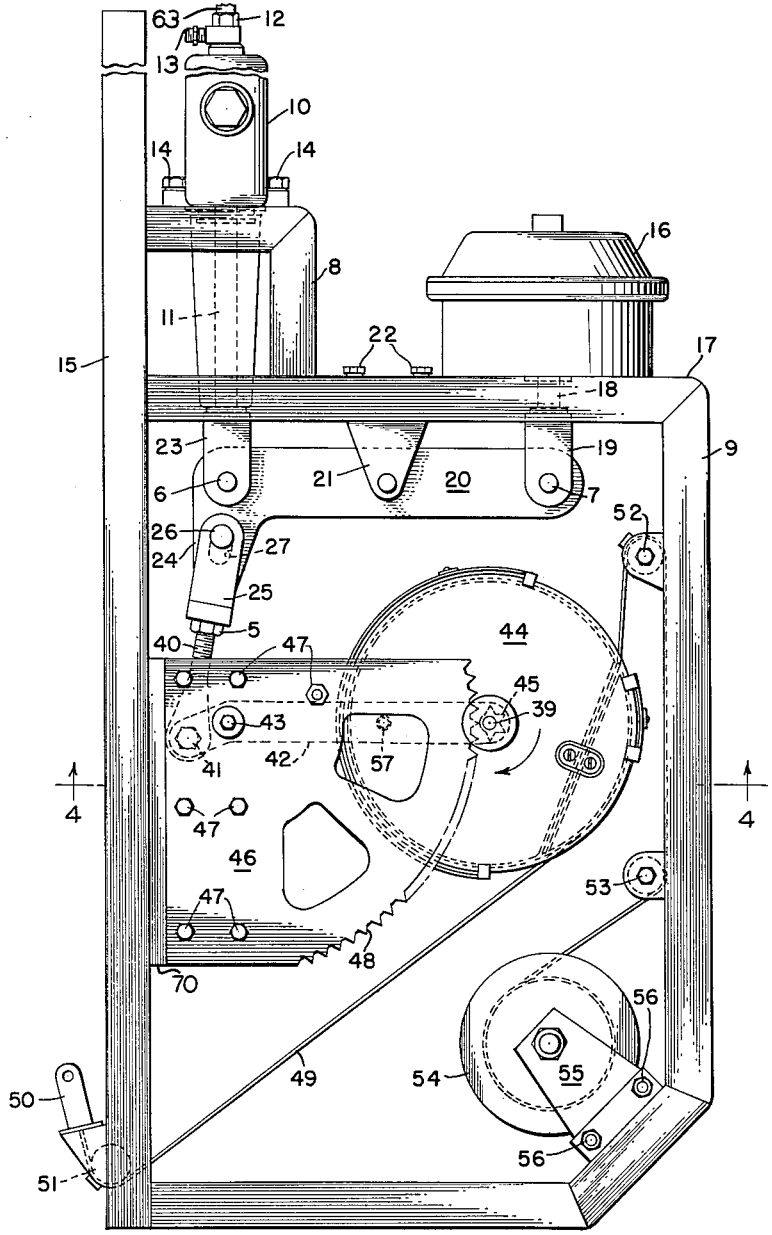
INVENTOR
CLARENCE J. CLEMENTS JR.
BY Donald P. Smith
ATTORNEY May 30, 1961 C. J. CLEMENTS, JR 2,986,428
BRAKE OPERATING SYSTEM
Filed Nov. 15, 1957 5 Sheets-Sheet 4
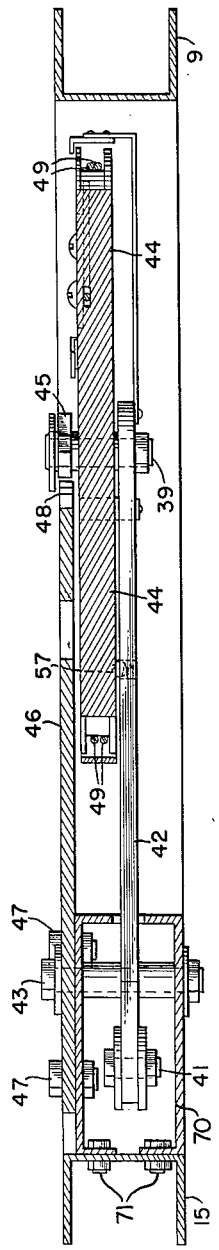
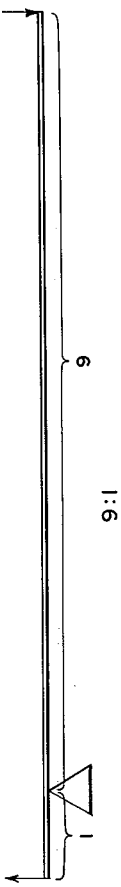
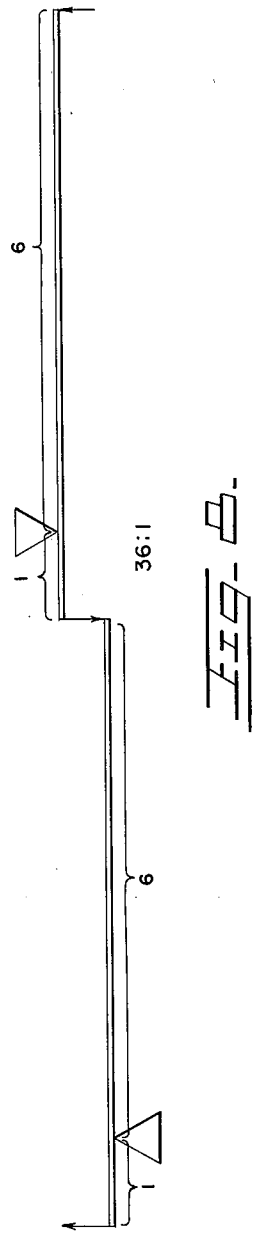
INVENTOR.
CLARENCE J. CLEMENTS JR.
BY
Donald P. Smith
ATTORNEY May 30, 1961 C. J. CLEMENTS, JR 2,986,428
BRAKE OPERATING SYSTEM Filed Nov. 15, 1957 5 Sheets-Sheet 5

INVENTOR.
CLARENCE J. CLEMENTS JR.
BY
Donald P. Smith
ATTORNEY

United States Patent Office 2,986,428
Patented May 30, 1961

2,986,428

BRAKE OPERATING SYSTEM

Clarence J. Clements, Jr., Silver Spring, Md., assignor to ACF Industries, Incorporated, New York, N.Y., a corporation of New Jersey Filed Nov. 15, 1957, Ser. No. 696,817

10 Claims. (Cl. 303—49)

This invention relates generally to a device for removing slack or lost motion in a mechanical system and relates more particularly to an actuator of the type usable in a brake system wherein by reason of wear or maladjustment a certain amount of actuator travel is required before the brakes are applied with a positive force.

In most braking systems a friction shoe is urged against a drum fastened to a wheel or rotating member. There are, of course, many ways of imparting thrust to urge the shoes against the cooperating drum the most common, perhaps, being the well known hydraulic system as used in road vehicles wherein a pump is moved at the will of the operator to transmit force via a working fluid through conduits into a fluid motor which may be a cylinder having a movable piston connected to the friction shoes to force them against the drum. As the shoe facings wear or if the system suffers a fluid loss the organization acquires a considerable amount of slack and the pump must be moved an appreciable distance before the shoes finally engage against the drum, such slack being a disadvantage in that time is lost in obtaining braking force and the amount of reserve actuator motion is reduced thus inviting brake failure. As is also known the mechanical linkages in the connecting system wear rapidly when not properly maintained and a round hole holding a clevis pin becomes elliptical thus permitting additional mechanical motion before the shoes are applied against the drum.

It is within the purview of this invention to provide a system wherein looseness or slack is tightened rapidly and the brake facings are applied against the drums at a higher and automatically applied mechanical advantage.

The invention will be described in connection with a military trailer of the type used to transport large ordnance such as bombs to an aircraft for loading from the underside. Under normal operation energy for braking the trailer is supplied from the tractor or truck but such vehicle is usually too high to pass under the bomb bay and the trailer may be pushed into position and left there, energy for lifting the bomb being supplied by the aircraft. The trailer usually is left in position under the aircraft and the tractor disconnects and moves on to convey another trailer to its selected location thus using a limited number of tractors for an assemblage of trailers. The trailer, then, must be braked in situ and the brake must hold it against movement when detached from the tractor.

The trailer is frequently moved independently of the tractor and the manually actuated system installed thereon must act positively and quickly when braking is desired. These movements are not unlike those used in railroad service in transporting cars between trains and it will be apparent that the invention is of general utility in any vehicle. As will now be more particularly pointed out the instant invention provides rapid braking action even in a worn or partly defective system.

It is accordingly an object of this invention to provide an actuator of the type usable in brake systems wherein slackness in the system is removed at a relatively high speed and the brake is applied at a lower speed and at a higher mechanical advantage.

It is a further object of this invention to provide an actuator wherein initial motion of the device is accomplished at a first mechanical advantage and resistance to such motion automatically changes the mechanical advantage to a higher level.

It is a more distinct object of this invention to provide a brake actuator wherein initial force is applied to the brake system through a simple lever device and system resistance acts to automatically add a gear train into the lever device whereby the mechanical advantage is greatly increased.

It is a yet further object of this invention to provide a brake actuator that operates quickly and with minimum travel and effort.

Other objects and advantages of the system will be in part obvious and in part explained in the following specification in which:

Figure 2 is an elevation in section showing the details of one portion of the system of Figure 1.

Figure 3 is a top plan view of the emergency brake system embodied in this application.

Figure 4 is an elevation of a portion of the device of Figure 3 taken on the lines 4—4 and looking in the direction of the arrows.

Figures 7 and 8 are schematic representations of the several lever systems available using the device of Figures 3 and 4.

Figure 1:
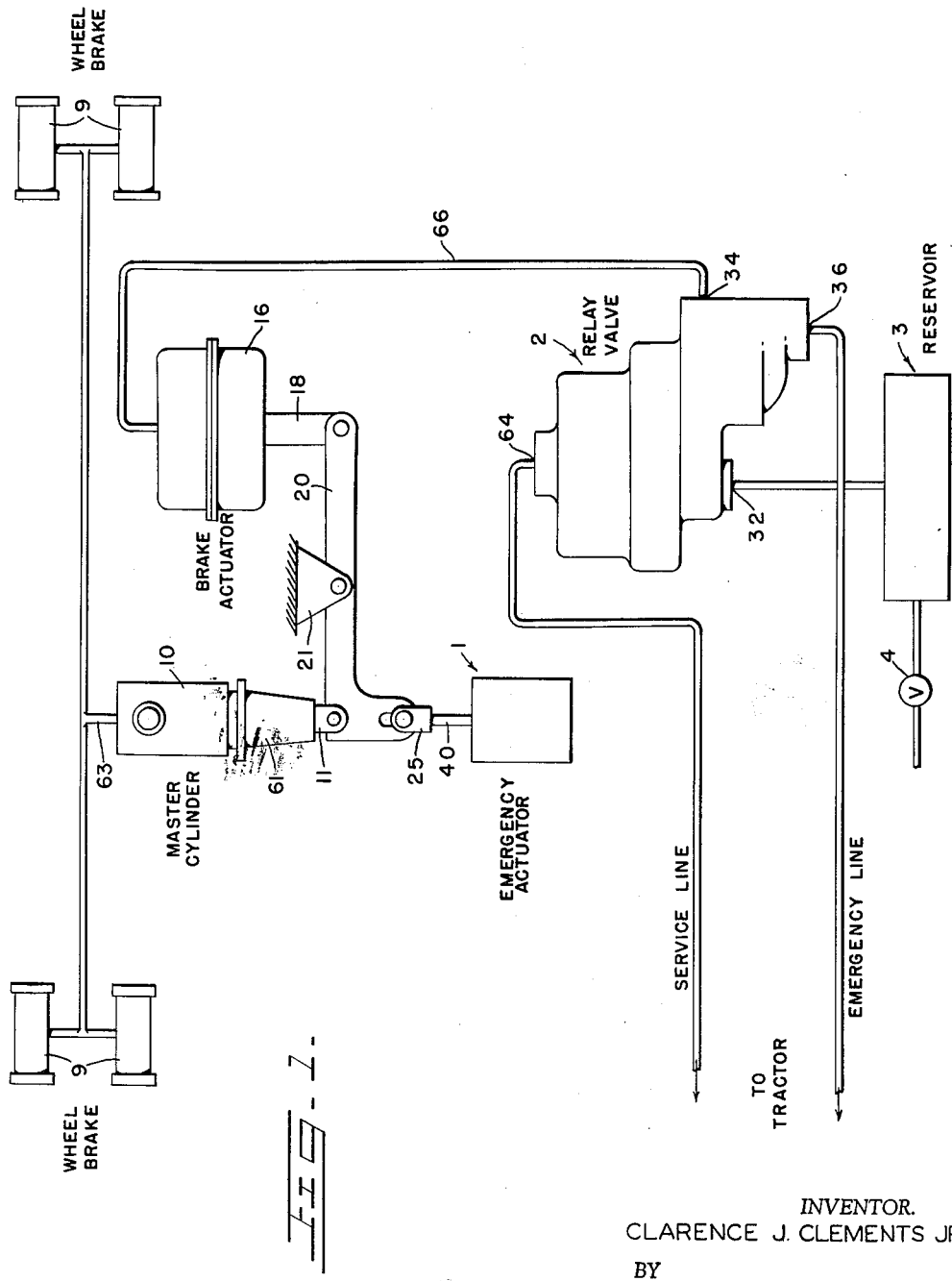
Figure 1 is a schematic representation of a brake system showing the preferred setting of the invention.

The brake system revealed in Figure 1 is used to illustrate the setting for the emergency system indicated generally by reference character 1. All the structure in Figure 1 is mounted on the trailer, communication with the tractor as a source of braking energy being made through flexible pipes designated Service Line and Emergency Line, such lines being connected through a relay valve 2 to an air reservoir 3 having a standard bleed valve 4. The valve is connected through pipe 66 to a service actuator 16. As will later be fore fully pointed out the emergency actuator 1 is connected into the service system through arm 20 which is pivotable on fulcrum 21. In the usual manner a hydraulic cylinder 10 of known type having a flexible shroud 61 communicates with wheel brakes 9 through conduits 63, and the service actuator 16 is connected by rod 18 to one end of arm 20 to normally pivot the same about fulcrum 21 to thereby increase the pressure in the master cylinder or oil pump 10 and the wheel cylinders or oil motors 9.

The details of the prior art relay valve are revealed in Figure 2. This is a simplified illustration of a relay valve of a type manufactured by Bendix Westinghouse Corp. If the trailer and tractor are interconnected and the trailer air reservoir is charged then air from the service line from the tractor enters service line port 64 formed in the relay housing and forces down diaphragm 30 which opens valve 31; air then flows from the reservoir through the reservoir port 32 past normally open valve 33 and out brake port 34 to the brake actuator 16 seen in Figure 1. When the pressure on the lower side of diaphragm 30 equals the pressure on the top of same the valve 31 closes and the two pressures are equalized. When the pressure in the service line is lowered by releasing the brake pedal in the tractor the pressure below diaphragm 30 forces it up thereby opening passage 35 which exhausts the pressure to atmosphere and releases the brakes.

The emergency section of the valve is functionally separate from the service section. Air pressure enters at emergency port 36 from the emergency line and air flows around floating check valve 37 through annular passage 38 to the reservoir. Air used in braking cycles is replenished through this route. If the emergency line should be severed pressure will fall at the emergency line port and pressure from the reservoir will then close check valve 37, force diaphragm 62 down, closing valve 33 and allow air to flow from annular passage 38 past seat 60 through port 34 to the actuator 16. The only way the brakes can then be released is to release the air from the reservoir at bleed valve 4 (Figure 1).

Thus when the tractor and trailer are connected the trailer brakes are applied from the tractor cab but when the trailer is disconnected an actuator must be provided to quickly and positively apply the brakes and hold the vehicle in position. The actuator here described is incorporated into the trailer hydraulic brake system and acts to apply force to the master cylinder.

It is recognized that some degree of looseness is inherent in every mechanical system, such looseness being variable and changing with system wear, leakage, and ambient conditions. No attempt is here made to eliminate or reduce system looseness but, rather, it is presumed that it does exist and the disclosed organization inherently operates to rapidly remove the slack prior to actual brake application.

Summarily stated, the invention includes a brake system having an actuator of the type wherein a loose organization is tightened at a relatively high rate and low mechanical advantage and friction shoes are subsequently forced against a brake drum at a higher mechanical advantage, such function being obtained by providing a lever movable at a predetermined first mechanical advantage and depending upon resistance of the tightened brake system to release a detent and add a gear train to the lever to thereby multiply the lever mechanical advantage by the gear ratio.

Referring now to Figures 3 and 4, reference character 10 indicates the hydraulic brake master cylinder having rod 11 and fittings 12 and 13 to be connected to conduit 63 of Figure 1. The cylinder is supported on angle bracket 8 by bolts 14 which, in turn, is held to one member 15 of a trailer housing. The service air actuator 16 is mounted to end wall 17 and has its piston rod 18 connected to clevis 19. Arm 20 is connected at one end by clevis pin 7 to clevis 19 and is pivotally mounted upon the fulcrum 21 secured to end wall 17 by bolts 22. A second clevis 23 is fastened to the other end of arm 20 by pin 6. The arm 20 has an offset portion 24, and a clevis 25 is secured to such portion 24 as by pin 26. An elongated slot 27 is formed in portion 24 for a purpose that will be presently explained. Pressure applied to actuator 16 causes rod 18 and clevis 19 to move in a downward direction and causes arm 20 to pivot about fulcrum 21 and move the rod 11 upward. The usual braking cycle is performed in this manner and elongated slot 27 permits motion of portion 24 relative to clevis 25 without imparting motion to clevis 25.

However when the brake is to be applied manually the emergency actuator is used as will now be described.

Clevis 25 is joined at one end to portion 24 of the arm 20 and is threaded into rod 40 and held by lock nut 5. The other end of rod 40 has an aperture formed therein to receive pin 41 and thereby be swingably joined to one end of arm 42 which, in turn, is pivotally mounted upon bolt 43. The other end of arm 42 has fastened thereto a drum 44 which is rotatably mounted on the arm by shaft 39 and has a concentric pinion 45, such pinion having one or more teeth missing. It will be readily apparent that the point of pivoting (43) of arm 42 is appreciably closer to the end joined to rod 40 than the end carrying drum 44 and thus forming a lever having a mechanical advantage in this illustrated embodiment of about 9:1.

A spring urged detent 57 normally seats between arm 42 and drum 44 as is best seen in Figure 4. A sector 46 is fastened to structural element 70 by bolts 47 and in turn is fastened to member 15 by bolts 71. An arcuate rack 48 is formed on one edge of sector 46 to cooperate with pinion 45. The center of revolution, then, of the rack 48 is pin 43. A flexible strand or lanyard 49 having a handle 50 secured to one end thereof passes through member 15 on pulley 51, is wrapped around drum 44, continues over pulleys 52 and 53, and is wound around drum 54 which has a return spring therein (not shown). Drum 54 is mounted on stanchion 55 and is secured by bolts 56 to the housing. A detent of any form may optionally be provided to retain strand 49 under tension when it has been pulled to apply the brakes.

Figure 5:
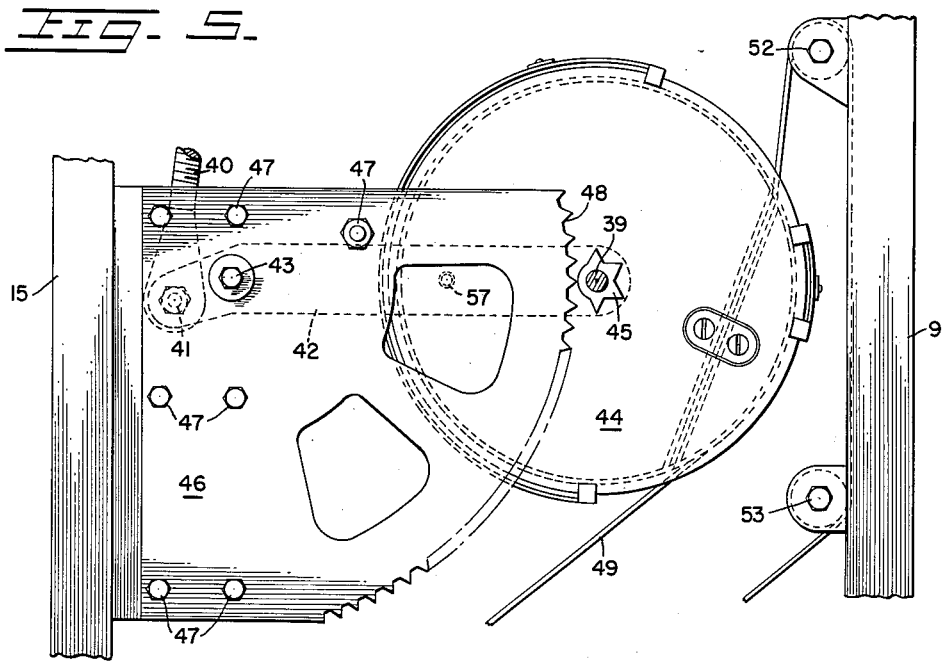
Figures 5 and 6 are fragmentary plan views illustrating the operation of the system.
Figure 6:
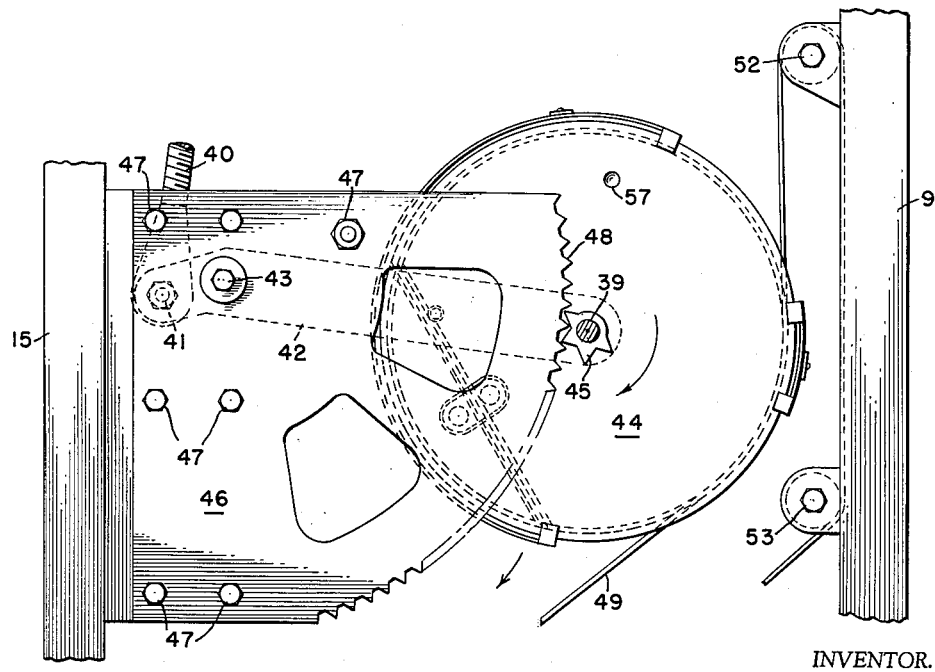

The operation of this device is as follows:

During normal brake system operation, arm 42 is not moved because elongated slot 27 permits pin 26 to move therein whereby the actuator is not affected during normal brake operation. However, if it is desired to apply the brakes manually from handle 50, force is applied to the handle and transmitted to drum 44 through strand 49. Urging at the periphery of drum 44 moves the arm 42 in a downward direction since detent 57 holds arm 42 and drum 44 locked together. The interrupted teeth (Figure 5) on pinion 45 permit the drum and pinion assembly to move adjacent the rack 48 without engaging the same as long as the drum does not turn. Arm 42 pivots about bolt 43 moving rod 40 in an upward direction until pin 26 has moved through the elongated hole 27 and all other play or slack in the several pivot points has been removed and a slight degree of pressure has been built up in the lines connected to the oil motors or wheel cylinders whereby the several shoes are moved into engagement with the brake drums. Upon engagement of the shoes with the drum further motion of arm 42 is resisted and the force applied to the periphery of drum 44 now breaks away the detent 57 and drum 44 is caused to rotate, thereby engaging (Figure 6) the teeth on the pinion 45 with the teeth on the rack 48 and forming a gear train on the lever thus forcing arm 42 further in a downward direction. This rotation of the drum 44 automatically increases the mechanical advantage as will be best seen by reference to Figures 7 and 8.

The Figure 7 and 8 drawings are to scale and the lever arm in Figure 3 between the outer periphery of drum 44 and bolt 43 is nine times longer than the spacing between bolt 43 and pin 41 thereby, as illustrated, giving a first mechanical advantage of 9:1 (Figure 7). Upon rotation of the drum 44 by breaking of the detent 57, the lever arm is shortened from the outer periphery drum 44 to the axis of pinion 45 which gives a lever arm ratio of 6:1, but an additional mechanical advantage in the ratio of 6:1 is obtained by the ratio of the drum (44) diameter to the pinion (45) diameter. As is seen in Figure 8 the overall mechanical advantage obtained between lanyard 49 and rod 40 is the product of the two, or 36:1.

This automatic shift from one mechanical advantage to another is very useful in manual application of brakes. If an operator has moved a vehicle in the absence of a towing vehicle and then wishes to apply the brake, the initial pull upon the lanyard moves the emergency assembly at a relatively high rate of speed to thereby remove all slack and tighten the brake system. As soon as the brake shoes engage the drum to actually apply vehicle retarding force and the detent permits rotation of the drum, the engagement of the pinion and rack teeth automatically increases the mechanical advantage fourfold thereby applying great thrust to the brake shoes. Obviously any ratio may be obtained by using different system geometry. In practice it has been found that a vehicle weighing several tons moving about ten miles per hour may be brought to an abrupt wheel locked stop as a result of the pull applied to the lanyard by an average 150 pound man.

Upon release of the tension in the lanyard the urging of the return spring in drum 54 prevails and rotates drum 44 to the position wherein the interrupted teeth on the pinion are adjacent rack 48, and the arm 42 then moves to full returned position wherein the detent 57 returns to locking position to hold the drum and arm together and the system is ready for another cycle.

It should be understood that this invention is not limited to the specific details of construction and arrangement thereof illustrated, and that changes and modifications may occur to one skilled in the art without departing from the spirit of the invention.

I claim:

1. An actuator of the type usable in brake system comprising in combination a brake rod, an arm connected at one end to said rod, means mounting said arm for pivoting motion, a drum rotatably mounted to the other end of the said arm, a detent to normally interlock the drum with the arm, a pinion fixed to said drum, a rack mounted adjacent said pinion to be engaged by the pinion, and a cable wound on the drum to cause initial pivotal motion of the said arm at a first mechanical advantage whereby upon exceeding a predetermined brake resistance the said detent releases the drum for rotation and the pinion teeth interengage with the rack teeth to raise the mechanical advantage.

2. An actuator of the type usable in brake systems comprising in combination a brake rod, an arm connected at one end to said rod, means mounting said arm for pivoting motion, a drum rotatably fixed to the other end of the said arm, a detent to normally interlock the drum with the arm, the said arm mounting means being fixed substantially further from the outer drum periphery than from the brake rod to thereby form a lever having a predetermined mechanical advantage, a pinion fixed to said drum, a rack mounted adjacent said pinion and forming the arc of a circle having the said arm mounting means as a center, and a cable wound on the periphery of the drum to cause initial motion of said arm at the predetermined mechanical advantage whereby upon exceeding a given resistance the said detent releases the drum for rotation and the pinion teeth interengage with the rack teeth to obtain a second mechanical advantage.

3. The invention as set forth in claim 2 wherein the said drum is so arranged that the second mechanical advantage is substantially larger than the first recited mechanical advantage.

4. An actuator of the type usable in brake systems comprising in combination a brake rod, an arm connected at one end thereof to said rod, means mounting said arm for pivotable motion, a drum rotatably mounted on the other end of the said arm, a detent normally interlocking the drum with the said arm, a pinion fixed for rotation with said drum, a rack mounted adjacent said pinion to be engaged therewith, said rack forming a curve and being concentric with the said arm mounting means, and a cable wound on the periphery of said drum to cause initial arm and brake rod motion whereby upon exceeding a predetermined resistance the said detent releases the said drum for rotation and the pinion teeth engage with the rack teeth to change the mechanical advantage of the system.

5. An actuator of the type wherein a slack brake rod is tightened at relatively high speed and low mechanical advantage and brakes are subsequently applied at a relatively low speed and high mechanical advantage comprising in combination an arm connected at one end to the brake rod, means mountnig said arm for arcuate motion, a drum rotatably fixed to the other end of said arm, releasable detent means to normally interlock the drum with the arm, the said arm mounting means being fixed between the arm ends and further from the outer drum periphery than from the brake rod to form a lever having a low mechanical advantage, a pinion fixed to said drum, a curved rack adjacent said pinion to cooperate with said pinion, and a cable embracing the drum whereby force applied to said cable causes initial relatively high brake rod motion at a low mechanical advantage to remove the slack and upon the brake resisting motion imparted thereto the detent releases the drum for rotation whereby the pinion moves along the said rack to form a lever having a high mechanical advantage.

6. An actuator of the type wherein a slack brake rod is tightened at a relatively high speed and low mechanical advantage and brake shoes are subsequently urged against a brake drum at a relatively low speed and high mechanical advantage comprising in combination an arm connected at one end to the brake rod, a pivot mounting said arm for arcuate motion, a drum rotatably carried on the other end of said arm, a detent normally interlocking between the drum and the arm, the said pivot positioned between the arm ends and further from the outer drum periphery than from the point of attachment of the brake rod to form a lever having a relatively low mechanical advantage, a pinion having interrupted teeth fixed to said drum, a rack adjacent said pinion and forming a curve parallel to the path of motion of the pinion axis, and a cable embracing said drum whereby force applied to said cable causes initial relatively high brake rod motion at low mechanical advantage to remove the slack and engage the shoes against the brake drum and upon resistance being imparted to the rod by such engagement the applied force prevails over the said detent and the said drum rotates to interengage the pinion teeth with the rack teeth to form a lever having a high mechanical advantage to force the shoes against the drum.

7. An actuator of the type wherein a loose brake system is tightened at a relatively high rate and low mechanical advantage and brake shoes are subsequently forced against a brake drum at a high mechanical advantage comprising in combination an arm connected at one end to a brake cylinder, means mounting said arm for arcuate motion, a drum rotatably carried on the other end of said arm, a detent releasably interlocking between the drum and the arm, the said mounting means positioned between the arm ends and further from the drum periphery than from the point of attachment to the brake cylinder to form a lever system having a low mechanical advantage, a pinion having interrupted teeth fixed to said drum, a rack adjacent said pinion and parallel to the path of motion of the pinion axis, and a flexible strand surrounding said drum whereby force applied to the strand causes initial relatively high speed arm motion to tighten the system and engage the shoes against the brake drum and upon resistance being encountered by such engagement the applied force releases the said detent and the said drum rotates to interengage the pinion teeth with the rack teeth to form a second lever system having a high mechanical advantage to press the shoes against the brake drum.

8. The invention as set forth in claim 7 including yieldable means urging the said drum and arm to inoperative position.

9. An actuator of the type wherein a slack system is tightened at a relatively low mechanical advantage and increased system resistance acts to raise the mechanical advantage comprising in combination pivoting means having one end connected to the system, rotatable means connected to the other end of said pivoting means, a rack and pinion assembly, the said rack fixed against motion and the pinion fastened to the rotatable means for motion therewith, means normally interlocking between the rotatable means and the pivoting means, and a cable wound on said rotatable means to move the pivoting means at an initial relatively low mechanical advantage to tighten the slack whereby subsequent system resistance breaks the normal interlocking between the rotatable means and the pivoting means to rotate the pinion against the rack to increase the mechanical advantage.

10. A vehicle brake system having an oil pump and a receiver at each wheel to urge friction shoes against wheel drums comprising in combination first and second means to actuate the oil pump, the said second means comprising pivoting means having one end connected to the oil pump, rotatable means connected to the other end of said pivoting means, a rack and pinion assembly, the said rack fixed against motion and the pinion fastened to the rotatable means for motion therewith, means normally interlocking between the rotatable means and the pivoting means, and a cable wound on said rotatable means to move the pivoting means at an initial relatively low mechanical advantage to tighten the slack whereby subsequent system resistance breaks the normal interlocking between the rotatable means and the pivoting means to rotate the pinion against the rack to increase the mechanical advantage.

References Cited in the file of this patent

UNITED STATES PATENTS

| | | | |
|---|---|---|---|
| 1,215,949 | Masson | Feb. 13, | 1917 |
| 1,986,428 | Dodge | Jan. 1, | 1935 |
| 2,126,849 | Weiss | Aug. 16, | 1938 |
| 2,260,566 | Gass | Oct. 28, | 1941 |
| 2,738,037 | Balcerek et al. | Mar. 13, | 1956 |
| 2,758,684 | Stickel | Aug. 14, | 1956 |
| 2,884,803 | Willis | May 5, | 1959 |

FOREIGN PATENTS

| | | | |
|---|---|---|---|
| 526,789 | France | July 8, | 1921 |
| 678,154 | France | Dec. 23, | 1929 |